July 5, 1927.
J. M. ULRICH
1,635,063
TRANSMISSION MECHANISM
Filed Jan. 20, 1925
5 Sheets-Sheet 1
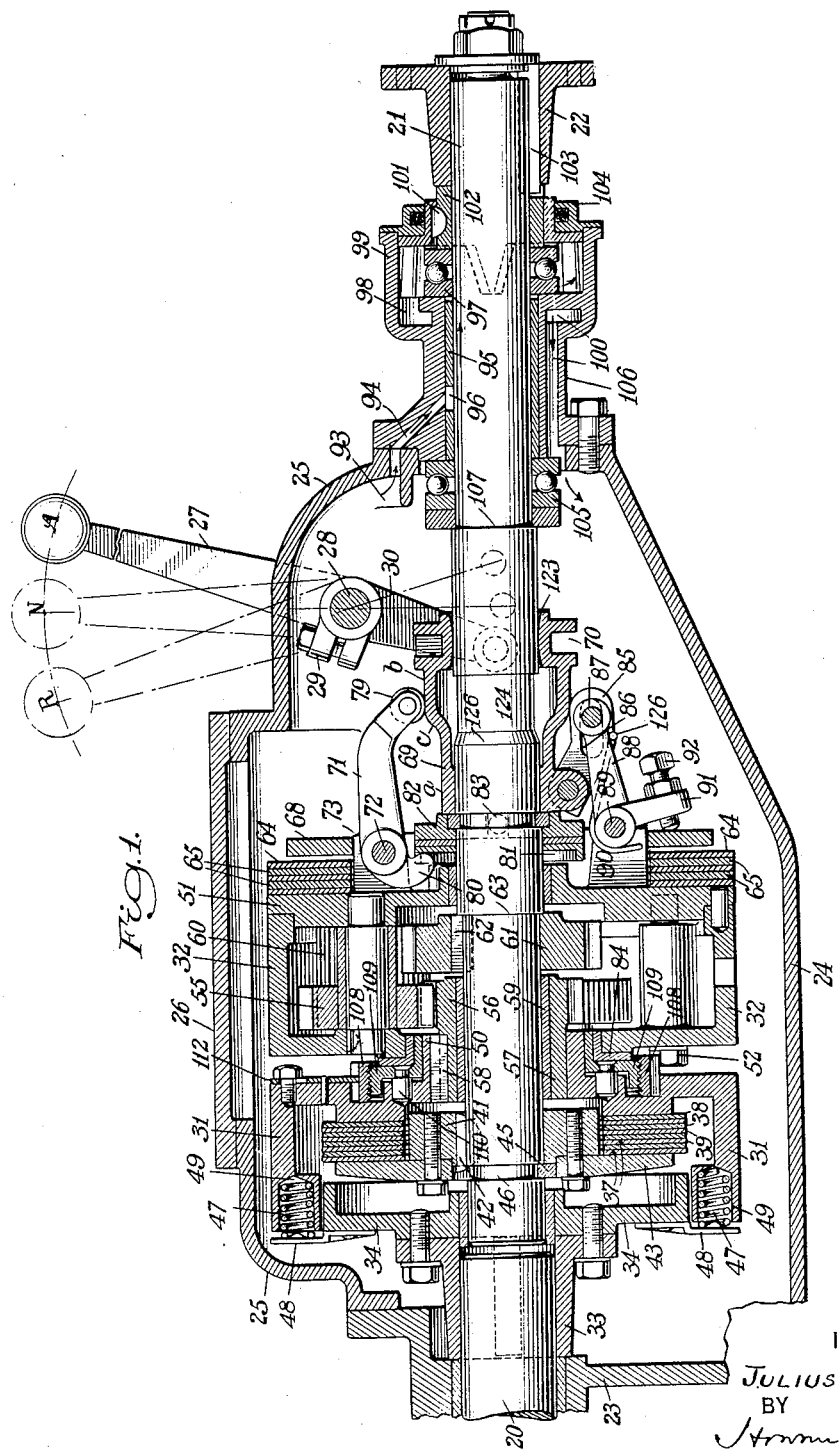
INVENTOR
JULIUS M. ULRICH
BY
ATTORNEYS July 5, 1927.  
J. M. ULRICH  
1,635,063  
TRANSMISSION MECHANISM  
Filed Jan. 20, 1925  
5 Sheets-Sheet 2
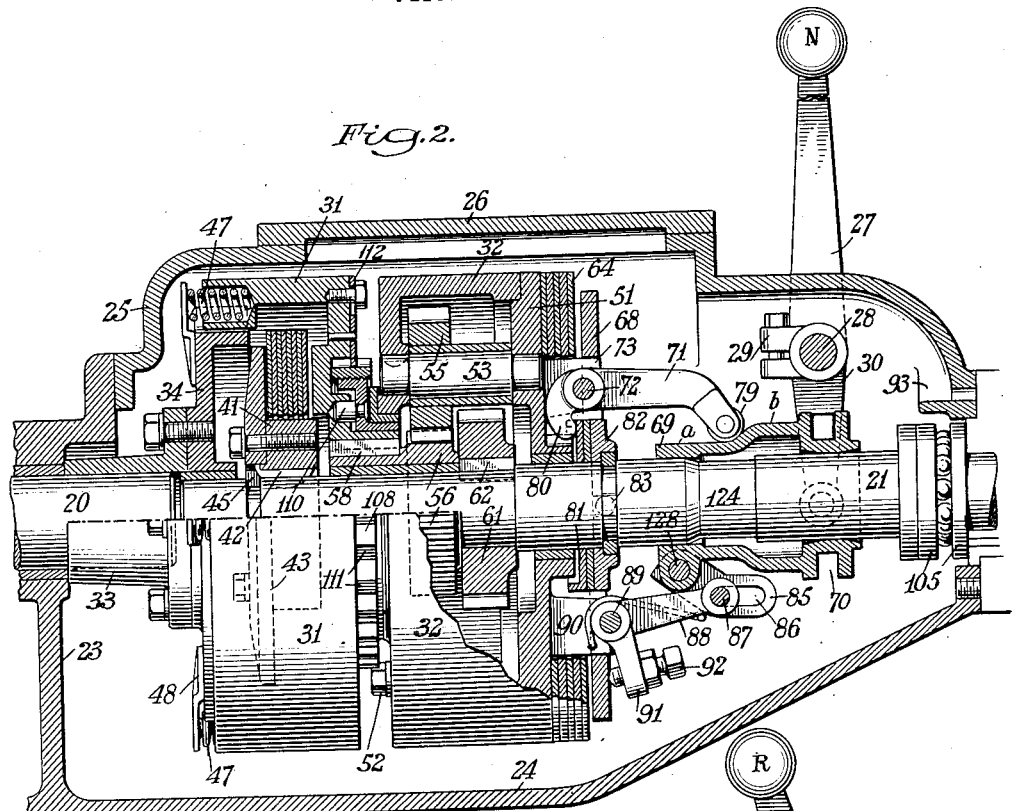
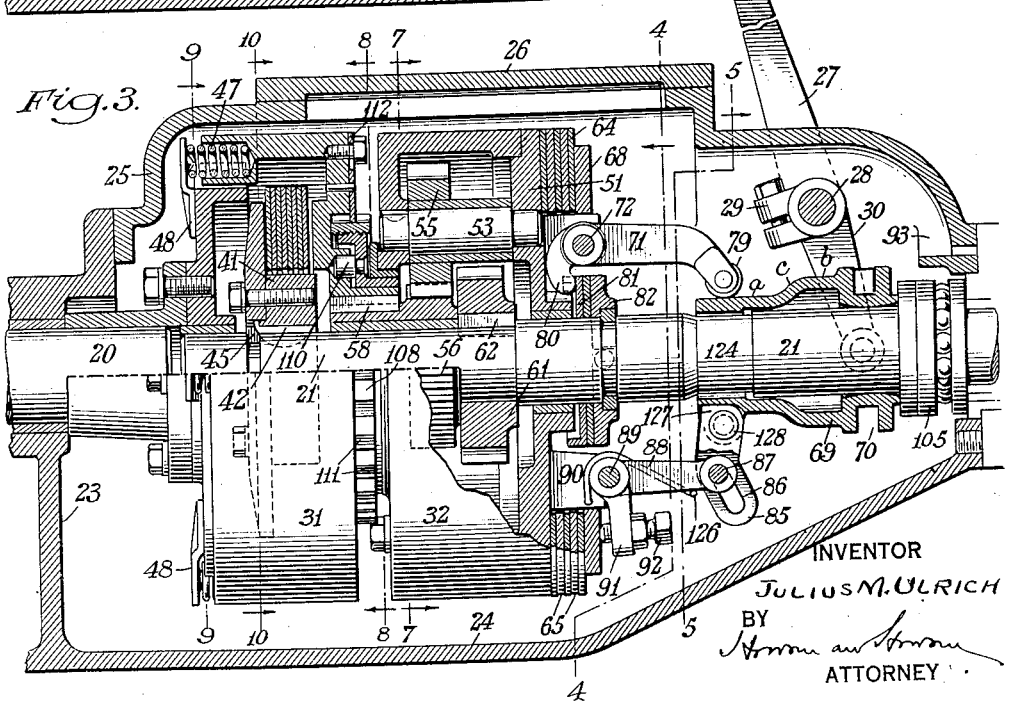
INVENTOR  
JULIUS M. ULRICH  
BY  
ATTORNEY July 5, 1927.

J. M. ULRICH 1,635,063

TRANSMISSION MECHANISM.

Filed Jan. 20, 1925

INVENTOR
JULIUS M. ULRICH
BY
ATTORNEYS

July 5, 1927.

J. M. ULRICH 1,635,063

TRANSMISSION MECHANISM

Filed Jan. 20, 1925    5 Sheets-Sheet 4

INVENTOR
JULIUS M. ULRICH
BY
ATTORNEY

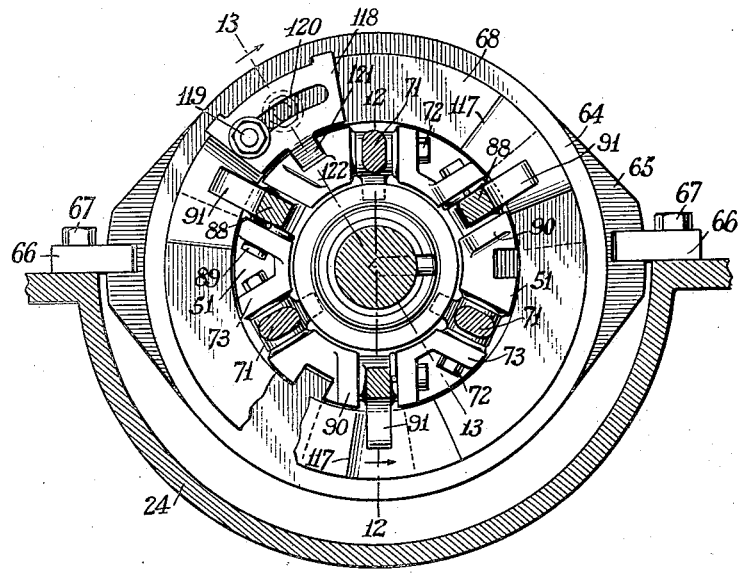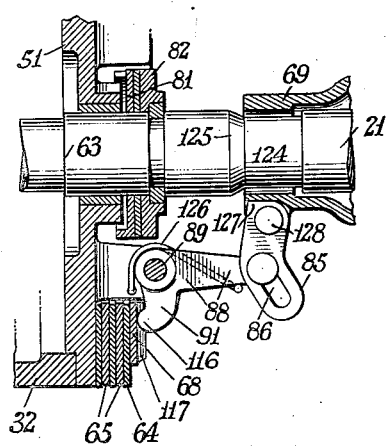

Patented July 5, 1927.

1,635,063

UNITED STATES PATENT OFFICE.

JULIUS M. ULRICH, OF GREENWICH, CONNECTICUT, ASSIGNOR TO PALMER BROS. ENGINES, INC., OF COSCOB, CONNECTICUT, A CORPORATION OF CONNECTICUT.

TRANSMISSION MECHANISM.

Application filed January 20, 1925. Serial No. 3,593.

My invention relates to transmission mechanism, and particularly to a reversing clutch of the disk type. Among the objects of my invention I may mention particularly—

(1) A reversing disk clutch mechanism adapted to a one-piece driven shaft;

(2) A reversing disk clutch comprising forward and reverse drums journalled for free rotation upon a one-piece driven shaft;

(3) A reversing disk clutch comprising a reverse gear and associated reverse drum both journalled for free rotation upon a one-piece driven shaft;

(4) A reversing disk clutch comprising forward and reverse drums and mechanism carried by the reverse drum head for operatively displacing the clutch elements on both forward and reverse drives;

(5) A lever operated cam spool for actuating said clutch displacing elements;

(6) Take-up devices for compensating the wear on the clutch plates for the forward and reverse drives respectively;

(7) An improved lubricating system; and (8) Various features of detail construction hereinafter described or shown in the accompanying drawings in which—

Fig. 1 is a longitudinal section through a clutch mechanism in which my invention is embodied in one form;

Figs. 2 and 3 are similar views showing the clutch in different positions;

Figure 4:
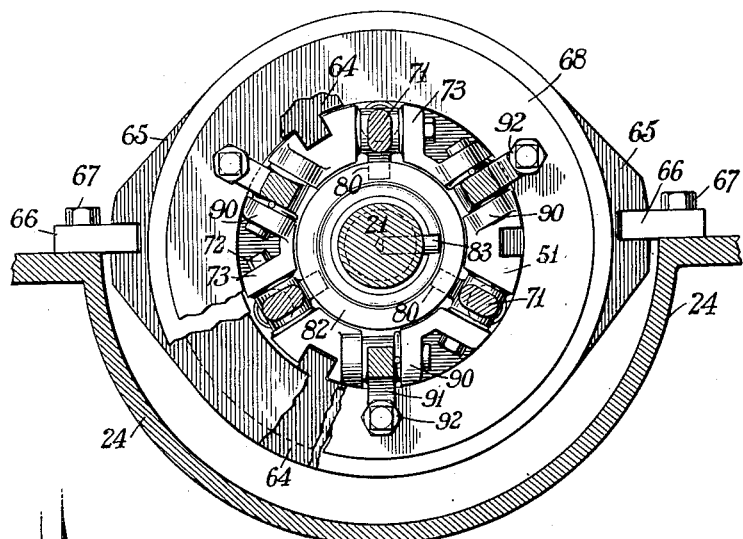
Figure 5:
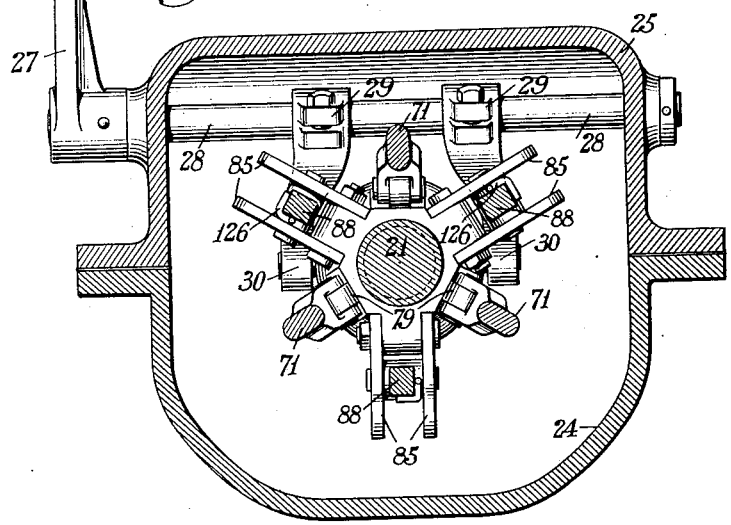
Figure 6:
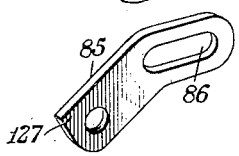

Figs. 4 and 5 are sections on the lines 4—4 and 5—5, Fig. 3, respectively;

Fig. 6 is a perspective of the link of the reversing toggle;

Figs. 7, 8, 9 and 10 are sections on the lines 7—7, 8—8, 9—9, 10—10, Fig. 3, respectively;

Fig. 11 is a broken section corresponding to Fig. 4, but showing a modified arrangement;

Figs. 12 and 13 are sections on the lines 12—12, 13—13, Fig. 11, respectively.

The present clutch device may be applied to any appropriate drive, but is particularly suitable for marine engines in which the motor shaft 20 is alined with the driven shaft 21, to the end of which is keyed the coupling member 22, although any other appropriate driven member may be substituted therefor. The driving shaft 20 may conveniently be the crank shaft of an explosion engine or the shaft of an electric motor, and is journalled as shown in one of the end housings 23 of the motor casing. In extension thereof is the lower half 24 of the housing for the reversing clutch mechanism to which my invention particularly relates. The upper half 25 of this housing is preferably provided with a removable cap 26 which permits access to the mechanism. The operating lever 27 is arranged outside the casing and oscillates a spindle 28 journalled in the housing and having secured thereto, by any appropriate means, such as a clamp 29, a clutch operating fork 30.

Figure 10:
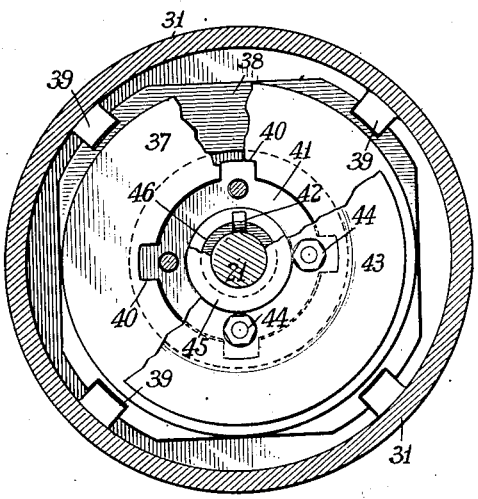

*Forward drive.*—The clutch comprises a forward drive drum 31 and a reverse drive drum 32, both journalled for free rotation and longitudinally displaceable on the one-piece driven shaft 21. The operating connection to the drive shaft 20 is effected through a coupling 33 fast to the end of the drive shaft, and having bolted thereto a drive head 34 in which the end of the driven shaft is journalled. In the periphery of the drive head 34 are notches 35 (Fig. 9) which receive heavy key lugs 36 formed at spaced intervals around the inner periphery of the drum 31. The drum 31 thus rotates constantly with the drive shaft 20, regardless of the direction of rotation of the driven shaft 21. Drive connection between the drum 31 and the shaft 21 is established through the longitudinally slidable clutch plates 37 and 38, the latter (38) keyed at 39 to the drum 31 (Fig. 10). The clutch plates 37 are keyed at 40 to a heavy collar 41, which in turn is keyed at 42 to the driven shaft 21. A thrust disk 43 is bolted at 44 to the collar 41 and takes the thrust of the plates on the longitudinal displacement of the drum to effect a clutching action as hereinafter described. Longitudinal displacement of the collar 41 and disk 43 is prevented by a thrust ring 45 let into the shaft at 46. It is obvious that when the drum 31 is shifted to the left (as hereinafter described) to bring the clutch plates 37 and 38 into engagement, the drive imparted to the plates 37 by the plates 38 keyed to the rotating drum 31 is transmitted to the shaft 21 through the collar 41 to which the plates 37 are keyed.

The plates 37 and 38 are normally free since springs 47 acting upon the drum 31, tend constantly to force it away from driving head 34 and thus away from thrust plate 43. Plates 48 secured to the driving head 34 confine the springs under stress in the pockets 49 formed in the heavy keys 36 at the inner periphery of the drum.

Figure 7:
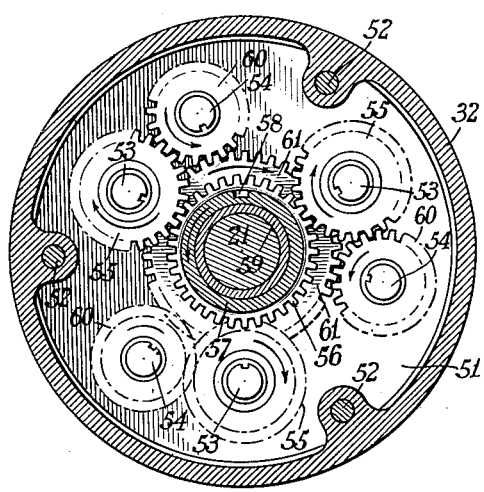
Figure 8:
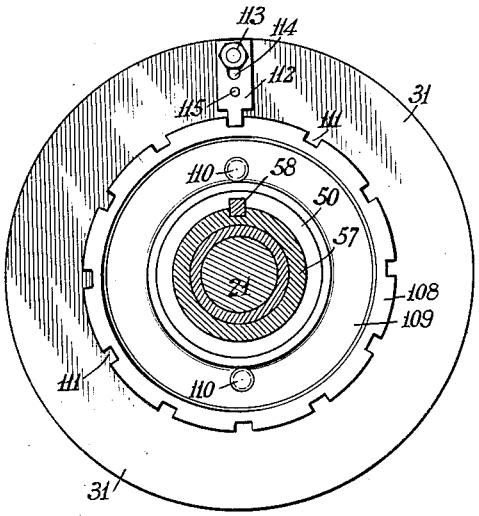
Figure 9:
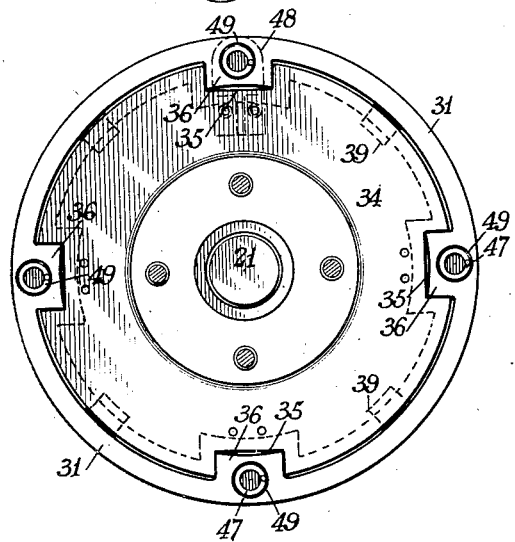

*Reverse drive.*—The reversing drum 32 is freely journalled at its closed end upon the hub 50 of the drum 31. It is closed at its opposite end by the head 51, bolted thereto at 52 (Fig. 7). Extending between the heads are pairs of stub shafts 53 and 54, preferably three pairs as shown. Meshing with the idler pinions 55 on the stub shafts 53 is a gear 56, the hub 57 of which extends within the hub 50 of the drum 31 and is keyed thereto at 58. A bushing 59 interposed between the gear 56 and the driven shaft 21 provides a free bearing for the gear on the shaft. Meshing with the idler 55 is a secondary idler 60, upon the stub shaft 54, which in turn meshes with gear 61 keyed at 62 to the shaft 21 and abutting against the shoulder 63 on the shaft to prevent longitudinal displacement.

Keyed to the hub of the reversing drum head 51 are floating clutch plates 64 which alternate with clutch plates 65 held against rotation by keys 66 bolted at 67 to the clutch casing 24 (see Fig. 4). A floating thrust plate 68 confines the clutch plates 64 and 65 between said thrust plate and the drum head 51. When the thrust plate 68 is shifted to the left to cause the clutch plates to frictionally engage, the drum 32 is held against rotation by reason of the fact that the plates 65 are stationary. The planetary gears 55 and 60 transmit the drive of the gear 56 (solid with the drum 31) to the gear 61 keyed to the driven shaft. The rotation of the shaft 21 is thus reversed and the speed of reverse rotation is dependent upon the ratio of the several gears 56, 55, 60 and 61.

*Operating mechanism.*—The clutch mechanism is operated by the spool 69, engaged at its annular groove 70 by the ends of the fork 30. The forward drive is effected through bell cranks 71 pivoted at 72 on lugs 73 on the reversing drum head 51. An anti-friction roller 79 at one end of the bell crank rides the spool 69 from the level *a* to the level *b* connected by the cam rise *c*. As the roller 79 passes up the cam *c* from the level *a* to the level *b*, the nose 80 at the opposite end of the lever thrusts against the disk 81, spaced by a light washer from thrust collar 82 pinned at 83 to the shaft 21. The thrust exerted by the lever longitudinally displaces the drum 32, and in turn the drum 31, thus causing the friction plates 37 and 38 to engage and establish the forward drive of the shaft 21 through collar 41. The friction at the bearing bush 84 causes the drum 32 to gradually pick up speed until it rotates with the drum 31 on the forward drive.

When the lever 27 is shifted to neutral position, (see Fig. 2) the roller 79 of bell crank 71 runs down the incline *c* to level *a* and the springs 47 displace the drum 31 to the right, thus releasing the engagement between the plates 37 and 38 and halting the drive of the shaft 21 through collar 41. In this position the drum 31 is still driven, and with it the gear 56, with the result that the drum 32 is also rotated in the same direction as the drum 31, but at a speed dependent upon the gear ratio of the planetary system. The gear 61 is held stationary by the shaft 21 and its load.

The reverse drive of the shaft is effected by movement of the lever 27 further to the left, causing the spool 69 to move to the right. At spaced points around the spool are pivoted links 85 in the offset free ends of which are slots 86. Working in the slots are pins 87 carried at the end of each bell crank 88 pivoted at 89 on lugs 90 fast with the drum head 51. The short arms 91 of the bell cranks 88 are provided with adjustable thrust screws 92 adapted to bear against the floating plate 68. In the position of the forward drive, each pin 87 is located near the far end of the slot 86. As the lever 27 is moved to neutral position, the pin 87 moves to the other or near end of the slot, but without affecting the position of the bell crank 88. Further swing of the lever 27 to reverse drive position (Fig. 3) causes the link 85 to effect a toggle action upon the bell crank 88, thus forcing the set screws 92 against the thrust plate 68 and causing the latter to press against the clutch plates 64 and 65. This results in halting the rotation of the reversing drum 32 by reason of the fact that the plates 65 are held against rotation. The shaft is therefore driven in reverse direction through the gear 61, the planetary pinions 60 and 55, and the gear 56 fast with the drum 31.

Thus, while the drum 31 rotates in one direction at the speed of the drive shaft 20 at all times, the drum 32 on the other hand (1) rotates in the same direction and at the same speed as the drum 31 during the forward drive of the shaft 21; (2) rotates in the same direction as drum 31, but at reduced speed when the driven shaft 21 is stationary, with the clutch in neutral position; and (3) is held stationary during the reverse drive of the shaft 21.

*Lubrication.*—Lubrication of the clutch bearings and friction elements is of importance. The housing 24—25 is therefore entirely closed and is designed to be flooded with oil to a considerable depth. The same supply of lubricant is used for the end bearing. For this purpose an inclined vane 93 is formed at the end of the upper section 25 of the housing which leads the splash oil to a channel 94 through which it flows to the end bearing bush 95, in which the shaft 21 freely rotates. An appropriate opening or openings 96 may be formed in the bush. The oil passes thence to bearings 97, which open to chamber 98 within which rotates the return oil flinger 99 by the oppositely inclined vanes of which the oil is thrown back (on rotation in either direction) into channel 100 and discharges thence to the lower section 24 of the clutch housing. The oil flinger 99 is keyed at 101 to the hub bushing 102, which in turn is keyed to the shaft 21 by the key 103 which secures the coupling 22 rigidly to the shaft end. A stuffing box cap 104 is secured in any suitable way to the end of the chamber 98 and serves to prevent escape of oil beyond the oil flinger 99.

The end thrust bearing 105 of the shaft 21 is seated against the end of the bearing sleeve 106 and is engaged by a shoulder 107 on the shaft and takes the longitudinal thrust of the shaft at this point.

*Take up devices.*—Certain features of detail improvement remain to be pointed out. As wear occurs between the friction plates of the drum 31, it is desirable to effect a take-up so that there may not be too much lost motion between the parts. For this purpose I have provided at the hub of the drum 31 an adjusting ring 108 (Figs. 1 and 8) internally threaded to screw upon an exteriorly threaded thrust ring 109 slidably pinned at 110 to the hub. The adjusting ring 108 is provided with peripheral notches 111, any one of which is adapted to be engaged by the detaining finger 112 secured against the end face of the drum 31 by the machine screw 113. The latter passes through a slot 114 in the finger 112 so that the latter may be shifted radially out of engagement with the notch 111 after the bolt 113 has been turned out sufficiently to free the finger. To hold the finger against angular displacement on the screw 113, a pin 115 projects slightly beyond the end face of the drum and engages in a hole in the finger 112. It is therefore necessary to turn the screw 113 out a sufficient distance to permit the finger 112 to be freed from the pin 115 before the finger can be shifted radially out of the notch 111. When the finger has been thus freed and lifted, the adjusting ring 108 can be screwed on the member 109, thus displacing the latter longitudinally to take up the wear between the plates. When the desired adjustment has been obtained, the finger 112 is re-engaged with another of the notches 111 in the ring 108 to hold the parts in adjusted relation.

It will be obvious that the adjustment described is available to take up not only wear between the friction plates of the drum 31, but also any wear that may occur between the nose 80 of the bell crank 71 and the thrust plate 81 against which it bears. Very little wear at this point will occur since the bearing 81 rotates with the member 80 during the forward drive of the shaft 21, and is free from frictional engagement in the neutral and reverse positions of the clutch.

A take-up for the reverse drive mechanism is afforded in the construction shown in Figs. 1–10, by the set screws 92, provided on each of the bell crank arms 91. A take-up of this character, however, is objectionable because there may be some variations in the set-up of the screws. I have therefore illustrated a more satisfactory take-up arrangement for the reverse drive in the construction shown in Figs. 11, 12 and 13. In this construction the arms 91 of the bell crank 88 are provided with noses 116 which bear directly against the thrust plate 68— the adjustable set screws 92 being omitted. At the points at which the noses 116 bear against the thrust plate, the latter is provided with circumferential cam surfaces 117, and a keyed engagement between the thrust plate and the hub of the cover 51 of drum 32 is established through one or more adjusting caps 118, to maintain the thrust plate in definite relation to the bell cranks—as distinguished from the construction shown in Fig. 4 in which the thrust plate 68 is full floating. Each of these caps 118 is secured to the thrust plate 68 by a machine screw 119 passing through an arcuate slot 120 in the cap which is provided with a lug 121 adapted to take into a notch 122 in the hub of cover 51. When the screw 119 is released, the thrust plate 68 may be rotated with respect to the hub and cap 118 until another portion of the cam surface 117 is brought beneath the bearing nose 116 of the bell crank 88. If the screw 119 be now set up with the parts in this adjusted position, the cap 118 firmly maintains the adjustment.

*Rocking spool.*—Whether the adjustment be by set screws 92, or by the cap 118, there is always the possibility that one or the other of the bell cranks 88 will exert more effort than another against the plate 68. The thrust of the bell crank levers may thus be unequal upon the spool 69, and tend to cause the latter to bind on the shaft 21 with the result that undue heating at this point may occur. To take care of this condition the bearings of spool 69 upon the shaft 21 are longitudinally spaced, and at one of these points, for example at the collar 70, the bearing is convex inward as indicated at 123, so that the spool may have some angular play with respect to the shaft. For the same purpose the latter is relieved at 124 to afford clearance. In the reverse position of the control lever 27 the bearing at the left hand end of the spool 69 registers with the relief 124 in the shaft (see Fig. 12). Consequently, by reason of the rocking bearing 123 at the opposite end of the spool, the latter may assume such angular position as may be demanded to insure an equal thrust by all of the bell cranks 88 against the plate 68. The relief 124 in the shaft is preferably beveled at 125 in a direction to lead the bearing at the left hand end of the spool onto the shaft as the lever 27 is shifted to neutral or forward position.

*Counteraction of centrifugal force.*—Inasmuch as the spool 69 rotates with considerable rapidity, the free end of each link 85 and the connected end of the bell crank 88 tend to swing outward under the action of centrifugal force when the shaft 21 is driven forward. This centrifugal effort may be sufficient to cause the bell crank to shift the thrust plate 68 into engagement with the friction plates of the drum 32. To meet this difficulty I provide for each bell crank 88 a spring 126, one end of which is engaged in one of the lugs 90 of the pivot pins 89, and the other end looped over the free end of the bell crank 88 to exert constantly a radially inward pressure upon the latter. The spring is of sufficient strength to overcome the centrifugal effort, but is of negligible importance with respect to the operation of the control lever 27.

*Toggle action limit.*—It may also be pointed out that the link 85 of the bell crank toggle is provided with a nose 127 which forms a stop limiting the throw of the link when the lever 27 is moved to reverse position (see Fig. 3). The proportions of the parts are so predetermined that in the reverse position the pin 87 is moved slightly over center with respect to the axis 128 of the link 85. The effort of the spring 126 upon the bell crank lever 88 is exerted in a direction to maintain the toggle set in reverse position, and since there is no centrifugal force now acting, by reason of the fact that these elements are now stationary, the full effort of the spring to maintain the position is exerted.

Finally it is a feature of advantage that on reverse the movement of the cam spool 69 is in a direction away from the drum 31. Consequently there is no tendency to crowd the drums 31—32 together against the action of the springs 47 during the reverse drive. The toggle link in effect exerts a double effort—first a direct pull of the drum 32 to the right and away from drum 31, and second a bell crank thrust of the plate 68 to the left to grip the friction plates. There is no tendency of the drum 31 to follow the drum 32 to the right under the pressure of the forward drive clutch opening spring 47, since in both neutral and reverse drive positions, the drum 31 is halted in its movement toward drum 32, by the gear 61, abutting against shoulder 63 on the shaft and engaged at its opposite end by the hub of gear 56 fast with the hub of drum 31. In both neutral and reverse positions therefore the two drums are entirely free of each other.

The mechanism affords a reliable and workable layout, the parts of which are rugged and serviceable. The free rotation of both drums upon the driven shaft, makes it possible to use a one-piece shaft, journalled at one end in the head of the driving shaft, and at its opposite end in the casing, with the several clutch elements mounted on the drive shaft between these bearings. The problem of intermediate bearings, and other features incident to a multi-part driven shaft are thus eliminated.

With the understanding that the conception which underlies what I claim as my invention may be embodied in other specific structures than that shown and described.

I claim—

1. A transmission, comprising a driving shaft, a driving head therefor, a driven shaft aligned with the driving shaft and journalled at one end in said driving head, a clutch member journalled for free rotation on said driven shaft and slidably engaged with said driving head, a thrust abutment member solid with the driven shaft and cooperating friction members respectively engaged with said abutment member and with said clutch member, in combination with means for longitudinally displacing said clutch member on the driven shaft to cause said friction members to engage, and a system of fixed and planetary gearing frictionally controlled and adapted to drive said driven shaft from said driving shaft in a reverse direction.

2. A transmission, comprising a driving shaft, a driving head therefor, a driven shaft aligned with the driving shaft and journalled at one end in said driving head, a clutch member journalled for free rotation on said driven shaft and slidably engaged with said driving head, a thrust abutment member solid with the driven shaft, cooperating friction members respectively engaged with said abutment member and with said clutch member, and means for longitudinally displacing said clutch member on the driven shaft to cause said friction members to engage, in combination with spring means for automatically shifting said clutch member in the opposite direction, and a system of fixed and planetary gearing frictionally controlled and adapted to drive said driven shaft from said driving shaft in a reverse direction.

3. A transmission, comprising a driving shaft, a driving head therefor, a driven shaft aligned with the driving shaft and journalled at one end in said driving head, a clutch member journalled for free rotation on said driven shaft and slidably engaged with said driving head, a thrust abutment member solid with the driven shaft, cooperating friction members respectively engaged with said abutment member and with said clutch member, and means for longitudinally displacing said clutch member on the driven shaft to cause said friction members to engage, in combination with take-up means interposed between said displacing means and the clutch member, and a system of fixed and planetary gearing frictionally controlled and adapted to drive said driven shaft from said driving shaft in a reverse direction.

4. In a transmission, a driven shaft, a clutch member slidable thereon, a thrust abutment member solid with the shaft, cooperating friction members respectively engaged with said slidable and thrust abutment members, means adapted to engage the slidable member to displace the same toward the abutment member to cause said friction elements to engage, in combination with a longitudinally adjustable take-up member at the end of said slidable member, against which said displacing means exerts its thrust, and a system of fixed and planetary gearing frictionally controlled and adapted to drive said driven shaft from said driving shaft in a reverse direction.

5. A transmission comprising a driving shaft, a driving head therefor, a driven shaft, a clutch member journaled for free rotation on said driven shaft and slidably engageable with said driving head, and a hub for said clutch member, in combination with a take-up member longitudinally adjustable on said hub, means for engaging said take-up member to displace the same lengthwise of the shaft, a thrust abutment member solid with the driven shaft, cooperating friction members respectively engaged with said abutment member and with said clutch member, means for longitudinally displacing said clutch member on the driven shaft to cause said friction members to engage, a system of fixed and planetary gearing connecting said driving shaft with said driven shaft, and friction means operable by said clutch adapted to prevent rotation of the planetary gears' axes about said shafts thereby causing the driving shaft to drive the driven shaft in reverse direction.

6. A transmission comprising a driving shaft, a driving head therefor, a driven shaft, a clutch member journaled for free rotation on said driven shaft and slidably engageable with said driving head, a hub for said clutch member, and a take-up ring slidable on the hub, in combination with screw means for adjusting the position of the take-up ring on the hub, means for holding the parts in adjusted position, a thrust abutment member solid with the driven shaft, cooperating friction members respectively engaged with said abutment member and with said clutch member, means for longitudinally displacing said clutch member on the driven shaft to cause said friction members to engage, a system of fixed and planetary gearing connecting said driving shaft with said driven shaft, and friction means operable by said clutch adapted to prevent rotation of the planetary gears' axes about said shafts thereby causing the driving shaft to drive the driven shaft in reverse direction.

7. A transmission comprising a driving shaft, a driving head therefor, a driven shaft, a clutch member journaled for free rotation on said driven shaft and slidably engageable with said driving head, a hub for said clutch member, and a take-up ring slidable on the hub, in combination with a screw ring engaging the take-up ring and rotatable with respect thereto to adjust the position of the take-up ring on the hub, means carried by the clutch member for holding the screw ring against rotation, a thrust abutment member solid with the driven shaft, cooperating friction members respectively engaged with said abutment member and with said clutch member, means for longitudinally displacing said clutch member on the driven shaft to cause said friction members to engage, a system of fixed and planetary gearing connecting said driving shaft with said driven shaft, and friction means operable by said clutch adapted to prevent rotation of the planetary gears' axes about said shafts thereby causing the driving shaft to drive the driven shaft in reverse direction.

8. In a transmission, a driving shaft, a driven shaft aligned therewith, a driving head solid with the driving shaft and in which the end of the driven shaft is journalled, a clutch member floating on the driven shaft but engaged with the driving head for rotation therewith, a thrust abutment member rigid with the driven shaft, cooperating friction elements respectively engaged with said abutment and floating members, and adapted to be brought into engagement by the longitudinal displacement of said floating member and to drive the driven shaft in one direction, a gear solid with said floating member, a second clutch member floating on the driven shaft, a gear solid with the driven shaft, planetary gears carried by said second floating member and operatively interposed between the gear solid with the first floating clutch member and the gear solid with the driven shaft to effect the reverse drive of the latter, friction members engaged with said second floating clutch member, cooperating friction members held against rotation, and means causing said friction members to engage the second floating clutch member against rotation and thus effect the reverse drive of the driven shaft through the planetary gears.

9. In the construction specified in claim 8, means preventing the simultaneous engagement of the friction elements of the two floating clutch members with their respective cooperating friction elements.

10. In a transmission, a driving shaft having a driving head solid therewith, a driven shaft aligned with the driving shaft, a clutch member floating on the driven shaft but operatively engaged with the driving head for rotation therewith, a gear solid with said floating clutch member, a second gear solid with the driven shaft, a second floating clutch member on the driven shaft, planetary gearing carried by the second floating clutch member, and interposed between the gear solid with the driven shaft and the gear solid with the floating clutch member, together with friction elements associated with the respective floating clutch members and alternatively operative to cause the rotation of the driven shaft either in one direction with the floating clutch member engaged with the driving head, or in the opposite direction through the planetary gear and the gear solid with the driven shaft.

11. In a transmission, a driving shaft having a driving head solid therewith, a driven shaft aligned with the driving shaft, a pair of independent floating clutch members on the driven shaft, one of said floating members having an engagement with the driving head for constant rotation therewith, drive connections between said floating members and the driven shaft to rotate the latter alternatively in opposite directions, means for shifting both said floating members bodily in one direction to render the drive connection of one of said floating members effective, and for shifting the other of said floating members independently in the opposite direction to render its drive connection effective.

12. In a transmission, a driving shaft having a driving head solid therewith, a driven shaft aligned with the driving shaft, a pair of independent floating clutch members on the driven shaft, one of said floating members having an engagement with the driving head for constant rotation therewith, drive connections between said floating members and the driven shaft to rotate the latter alternatively in opposite directions, means for shifting both said floating members bodily in one direction to render the drive connection of one of said floating members effective, together with means automatically operative to prevent the simultaneous displacement of said floating members to operative drive position.

13. In a transmission, a driving shaft having a driving head solid therewith, a driven shaft aligned with the driving shaft, a pair of independent floating clutch members on the driven shaft, one of said floating members having an engagement with the driving head for constant rotation therewith, drive connections between said floating members and the driven shaft to rotate the latter alternatively in opposite directions, means for shifting both said floating members bodily in one direction to render the drive connection of one of said floating members effective, and means halting the movement of one of said floating members in opposite direction while permitting the other of said floating members to move independently in said opposite direction to render its drive connection effective.

14. In a transmission, a driving shaft and a driven shaft aligned therewith, a clutch member floating on the driven shaft but engaged with the driving shaft for constant rotation therewith, a gear solid with said floating member, a second clutch member freely floating on said first floating member and on the driven shaft and embracing said gear, a gear solid with the driven shaft, planetary gears carried by the second floating member and operatively engaging the gears solid with the driven shaft and with the first floating member, and means for holding the second floating member against rotation to cause the drive of the driven shaft through the planetary gears.

In testimony whereof I have signed my name to this specification.

JULIUS M. ULRICH.